US009035019B2

(12) United States Patent
Yang et al.

(10) Patent No.: US 9,035,019 B2
(45) Date of Patent: May 19, 2015

(54) SYNTHESIS OF HIGH MOLECULAR WEIGHT PEO USING NON-METAL INITIATORS

(71) Applicants: Jin Yang, Pleasanton, CA (US); Kulandaivelu Sivanandan, Fremont, CA (US); Jonathan Pistorino, Oakland, CA (US); Hany Basam Eitouni, Oakland, CA (US)

(72) Inventors: Jin Yang, Pleasanton, CA (US); Kulandaivelu Sivanandan, Fremont, CA (US); Jonathan Pistorino, Oakland, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 123 days.

(21) Appl. No.: 13/684,147

(22) Filed: Nov. 21, 2012

(65) Prior Publication Data

US 2013/0131309 A1 May 23, 2013

Related U.S. Application Data

(60) Provisional application No. 61/562,851, filed on Nov. 22, 2011.

(51) Int. Cl.
C08G 65/26 (2006.01)
C08G 65/00 (2006.01)

(52) U.S. Cl.
CPC ........ *C08G 65/2612* (2013.01); *C08G 65/2675* (2013.01)

(58) Field of Classification Search
CPC ..................................................... C08G 65/26
USPC ......................................................... 528/421
See application file for complete search history.

(56) References Cited

U.S. PATENT DOCUMENTS

| 5,475,054 | A | 12/1995 | Abe |
| 6,274,277 | B1 | 8/2001 | Mori |
| 6,645,675 | B1 | 11/2003 | Munshi |
| 2003/0031933 | A1 | 2/2003 | Shembel |
| 2003/0222048 | A1 | 12/2003 | Asakawa |
| 2005/0175620 | A1 | 8/2005 | Jones |
| 2005/0256256 | A1 | 11/2005 | Muramoto |
| 2006/0036066 | A1 | 2/2006 | Izumi |
| 2009/0075176 | A1 | 3/2009 | Singh |

FOREIGN PATENT DOCUMENTS

| EP | 1529794 A1 | 5/2005 |
| WO | 99-33899 A1 | 7/1999 |
| WO | 01-04183 A1 | 1/2001 |

OTHER PUBLICATIONS

Esswein, "Polymerization of Ethylene Oxide with Alkyllithium Compounds and the Phosphazene Base "tBu-P4", Angewandte Chemie International Edition in English, 1996, vol. 35, No. 6, pp. 623-625."
Esswein, B. et al., 'Use of polyiminophosphazene bases for ring-opening 1,3-5,7-9 polymerizations', Macromolecular Symposia, 1996, vol. 107, Issue 1, pp. 331-340.
Eswein, "Anionic polymerization of oxirane in the presence of the polyiminophosphazene base t-Bu-P4," Macromol. Rapid Commun., 1996, V17, p. 143.
Helmut Schlaad. "Synthesis of alpha, omega-Heterobifunctional Poly(ethylene glycol)s by Metal-Free Anionic Ring-Opening Polymerization," Macromolecules, 2001, V34, p. 4302.
Groenewolt, "Polyisobutylene-block-Poly(ethylene oxide) for Robust Templating of Highly Ordered Mesoporous Materials," Adv. Mater., 2005, V17, p. 1158.
Junpeng Zhao, "Amphiphilic Polystyrene-b-poly(p-hydroxystyrene-g-ethylene oxide) Block-Graft Copolymers via a Combination of Conventional and Metal-Free Anionic Polymerization," Macromolecules, 2009, V42, p. 8661.
J. F. Hester, "ATRP of Amphiphilic Graft Copolymers Based on PVDF and Their Use as Membrane Additives," Macromolecules 2002, 35, 7652-7661.

*Primary Examiner* — Duc Truong
(74) *Attorney, Agent, or Firm* — R'Sue Popowich Caron

(57) ABSTRACT

A new synthetic method to prepare high molecular weight poly(ethylene oxide) with a very narrow molecular weight distribution (PDI<1.5) is described. The method involves a metal free initiator system, thus avoiding dangerous, flammable organometallic compounds.

6 Claims, No Drawings

SYNTHESIS OF HIGH MOLECULAR WEIGHT PEO USING NON-METAL INITIATORS

CROSS-REFERENCE TO RELATED APPLICATIONS

This application claims priority to U.S. Provisional Patent Application 61/562,851, filed Nov. 22, 2012, which is incorporated by reference herein.

STATEMENT OF GOVERNMENT SUPPORT

The invention described and claimed herein was made in part utilizing funds supplied by the U.S. Department of Energy under Contract No. DE-OE0000223. The U.S. Government has certain rights in this invention.

BACKGROUND OF THE INVENTION

Field of the Invention

This invention relates generally to a method of synthesizing high molecular weight polymer materials with narrow molecular weight distributions.

For some applications, it can be useful for polymer materials to have narrow molecular weight distributions. Narrow molecular weight distributions are achievable for low molecular weight polymers by using alkali metal salts to synthesize them. But as the size of the polymer molecules increases, it becomes more and more difficult to control the polydispersity.

High molecular weight PEO with a low polydispersity index (e.g., PDI<1.5) is not commercially available. In general, PEO with low PDI is not available at molecular weights above about 20 kDa.

High molecular weight polyethylene oxide (HWPEO) that has a narrow molecular weight distribution or polydispersity index (e.g., PDI<1.5) can be prepared by anionic polymerization using a metal-based initiator such as t-BuOK (potassium-tert-butoxide, alkyl lithium, or ROM (various metal alkoxides). The initiators themselves are made from reactive metals such as potassium or sodium, which are dangerous to store and to use, and may require extensive safety measures in order to incorporate into industrial processes. In addition, residual organometallic compounds or metal salts from the reaction can be detrimental to the performance of the HWPEO, especially for electrochemical and biological applications.

It would be useful to develop a process to synthesize HWPEO with low PDIs, which is inherently safe, leaves no organometallic residues, and is inexpensive to scale up to manufacturing levels.

SUMMARY

A method of synthesizing metal-free, high molecular weight polymers with low polydispersity has been provided. In one embodiment of the invention, the method involves providing a mixture of an alcohol and a solvent; adding a metal-free base to the mixture to make a metal-free initiator; adding monomers to the initiator; and allowing the monomers and the initiator to react to form a metal-free, high molecular weight polymer with a polydispersity less than 1.5. Various alcohols, solvents, and metal-free bases can be used, as is described in detail below. Monomers for which the method is useful include, but are not limited to, ethylene oxide, substituted oxyranes, ethylene sulfide, substituted cyclic sulfides, cyclic esters, lactides, and substituted forms of these monomers. It is possible to achieve polydispersities less than 1.5 or less than 1.1 for high molecular weight polymers with weights between about 20 and 500 kDa.

DETAILED DESCRIPTION

The embodiments of the invention are illustrated in the context of preparing high molecular weight PEO with low polydispersity. The materials and methods disclosed herein have application in a number of other contexts where low polydispersity in polymers is desirable, particularly where it is important to avoid metal content.

The aforementioned needs are satisfied by the process of the present invention which involves use of a new initiator system for making high molecular weight polymer materials.

Molecular weights are given herein as number average molecular weights.

In one embodiment of the invention, a new synthetic method for preparing high molecular weight poly(ethylene oxide) (HWPEO) with a very narrow molecular weight distribution (PDI<1.5) is provided. The method uses a metal-free initiator system that includes no dangerous organometallic compounds. The metal-free initiator system can be used to produce high molecular weight mono-hydroxyl poly(ethylene oxide) and di-hydroxyl poly(ethylene oxide) with well-controlled molecular weights and very low PDI.

In one embodiment of the invention, an alcohol is mixed with a solvent, and a metal-free base is added to make an initiator for an anionic polymerization reaction. In one example, phenol/t-BuP$_4$ which are non-metal organic compounds are used as an initiator system for ethylene oxide polymerization. In one arrangement, the initiator system can yield a very narrow molecular weight distribution of PEO (PDI<1.1). In addition to ethylene oxide, the described approach can be used to polymerize numerous other monomers including substituted oxyranes, ethylene sulfide, substituted cyclic sulfides, cyclic esters, lactides, and substituted forms of these monomers.

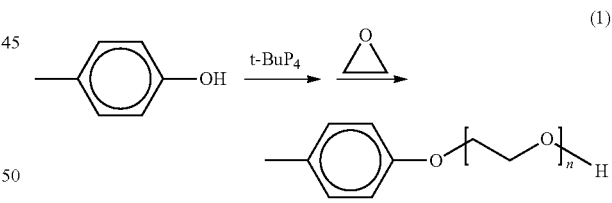

(1)

In one embodiment of the invention, shown as reaction (1), a mono-hydroxyl poly(ethylene oxide) has been synthesized. An alcohol is mixed with a solvent and t-BuP$_4$ is added to make an initiator for an anionic polymerization reaction. Examples of alcohols that can be useful include phenol, t-butyl alcohol, and 2-methyl-2-pentanol. Examples of solvents that can be useful include tetrahydrofuran, toluene, benzene, and DMSO (dimethyl sulfoxide). The alcohol, the solvent and the t-BuP$_4$, and therefore, the initiator are all metal free. Monomers are combined with the initiator and anionic polymerization occurs. As shown in reaction (1), monomers such as ethylene oxide (EO) can be used to form PEO. Reaction conditions such as concentrations, temperature, and reaction time vary depending on the exact monomer, solvent, and desired molecular weight and solution viscosity.

The molecular weight of the resulting PEO is limited only by the amount of EO monomer that is combined with the initiator. The more EO, the larger the PEO molecules. The reaction is not self-limiting. In addition, as they grow, the ends of the PEO molecules react only with monomers and not with one another. There are no reactions between PEO chains unlike with other polymerization methods, so the resulting molecules are generally all about the same size, with polydispersities less than about 1.5, or less than about 1.1.

In one arrangement, the HWPEO has a molecular weight greater than about 20 kDa. In another arrangement, the HWPEO has a molecular weight greater than about 100 kDa. In yet another arrangement, the HWPEO has a molecular weight greater than about 200 kDa. In yet another arrangement, the HWPEO has a molecular weight greater than about 500 kDa.

Under the same reaction conditions, diphenols can initiate ethylene oxide polymerization and make di-functional PEO in the presence of t-buP4 with the same effectiveness. In another embodiment of the invention, di-hydroxyl poly(ethylene oxide) can be made according to reaction (2). A difunctional alcohol (diol) is mixed with a solvent, and t-BuP$_4$ is added to make a difunctional initiator for an anionic polymerization reaction. Examples of diols that can be useful include bisphenol-A and 2,5-dimethyl-2,5-hexanediol. Examples of solvents that can be useful include tetrahydrofuran, toluene, benzene, and DMSO. The alcohol, the solvent and the t-BuP$_4$, and therefore, the initiator made from these are all metal free. The monomer is combined with the initiator and anionic polymerization occurs. As shown in reaction (2), bisphenol-A can be used to form linear PEO with hydroxyl groups at both ends. Reaction conditions such as concentrations, temperature, and reaction time vary depending on the exact monomer, solvent, and desired molecular weight and solution viscosity.

(2)

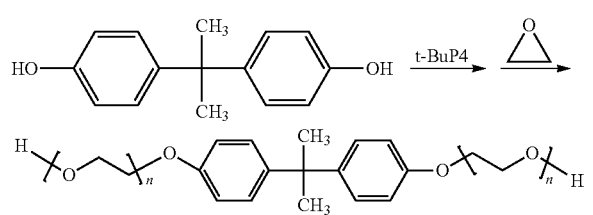

In another embodiment of the invention, a plurality of PEO molecules is provided. The PEO molecules have molecular weights greater than about 20 kDa, or greater than about 100 kDa, or greater than about 200 kDa, or greater than about 500 kDa. The PEO molecules have a polydispersity less than about 1.5 or less than about 1.1, and they contain no organometallic residues.

EXAMPLES

The following examples provide details relating to the method disclosed herein. It should be understood the following examples are representative only, and that the invention is not limited by the detail set forth in these examples.

Example 1

P-methylphenol (27 mg-0.25 mmol) was dissolved in 20 ml dried THF (tetrahydrofuran) in a reactor and then 0.3 mmol of t-BuP$_4$ (P$_4$-t-butyl phosphazene base) was added. The mixture was stirred for 12 hours at room temperature. Then 8.6 ml ethylene oxide was transferred into the reactor via vacuum line transfer. The mixture was stirred at 50° C. for 48 hours. (In other examples, the mixture can be stirred for at least 12 hours.) After cooling to room temperature, the reaction solution was poured into hexane to precipitate PEO out from the solution. After filtration and drying over vacuum, 6.5 g PEO was obtained. GPC (gel permeation chromatography) was used to determine the molecular weight of the PEO as 31,000 with a PDI of 1.1.

Example 2

Bisphenol A (120.8 mg-0.529 mmol) was dissolved in 10.58 mL of dried THF in a reactor, and 1.058 mol of t-BuP$_4$ was added. The mixture was stirred at room temperature for 12 hours. Then 120 mL of ethylene oxide was transferred into the reactor via vacuum line transfer. The mixture was stirred at 50° C. for 48 hours. (In other examples, the mixture can be stirred for at least 12 hours.) After cooling to room temperature, the reaction solution was poured into isopropyl alcohol to precipitate PEO out from the solution. The PEO was dried under vacuum, and 105.1 g of PEO was obtained. The GPC (gel permeation chromatography) was used to determine the molecular weight of the PEO as 146,000 with a PDI of 1.041.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:
1. A method of synthesizing metal-free, high molecular weight polymers with low polydispersity, comprising the steps of:
 a) providing a mixture of an alcohol and a solvent;
 b) adding t-BuP$_4$ to the mixture to make a metal-free initiator;
 c) adding monomers to the initiator;
 d) allowing the monomers and the initiator to react to form a metal-free, high molecular weight polymers with a polydispersity less than 1.5;
 wherein the alcohol is selected from the group consisting of bisphenol A, 2,5-dimethyl-2,5-hexanediol, phenol, and t-butyl alcohol.
2. The method of claim 1 wherein the solvent is selected from the group consisting of tetrahydrofuran, toluene, benzene, and DMSO.
3. The method of claim 1 wherein the monomers are selected from the group consisting of ethylene oxide, substituted oxyranes, ethylene sulfide, substituted cyclic sulfides, cyclic esters, lactides, and substituted forms of these monomers.
4. The method of claim 1 wherein the polydispersity is 1.1 or less.
5. The method of claim 1 wherein the high molecular weight polymers have a weight between about 20 and 500 kDa.
6. The method of claim 1 wherein the allowing step d comprises:
 stirring;
 maintaining a temperature;
 allowing the reaction to proceed for at least about 12 hours.

* * * * *